(12) United States Patent
Kobayashi et al.

(10) Patent No.: US 12,406,022 B2
(45) Date of Patent: Sep. 2, 2025

(54) DATA AUGMENTATION FOR MACHINE LEARNING

(71) Applicant: International Business Machines Corporation, Armonk, NY (US)

(72) Inventors: Hiromi Kobayashi, Tokyo (JP); Masaharu Sakamoto, Tokyo (JP); Aya Nakashima, Tokyo (JP); Kazuya Hirayu, Tokyo (JP); Sho Ikawa, Kanagawa-Ken (JP)

(73) Assignee: International Business Machines Corporation, Armonk, NY (US)

( * ) Notice: Subject to any disclaimer, the term of this patent is extended or adjusted under 35 U.S.C. 154(b) by 663 days.

(21) Appl. No.: 17/455,514

(22) Filed: Nov. 18, 2021

(65) Prior Publication Data
US 2023/0153383 A1    May 18, 2023

(51) Int. Cl.
*G06F 18/00* (2023.01)
*G06F 18/214* (2023.01)
*G06V 10/46* (2022.01)

(52) U.S. Cl.
CPC .......... *G06F 18/214* (2023.01); *G06V 10/462* (2022.01)

(58) Field of Classification Search
CPC ... G06F 18/214; G06V 10/462; G06V 10/774
USPC ....................................................... 382/157
See application file for complete search history.

(56) References Cited

U.S. PATENT DOCUMENTS

| 11,263,744 | B2* | 3/2022 | Yoo ...................... G06T 7/0012 |
| 2016/0189343 | A1 | 6/2016 | Chen et al. |
| 2019/0354817 | A1* | 11/2019 | Shlens ...................... G06T 3/60 |
| 2020/0401851 | A1 | 12/2020 | Mau et al. |
| 2022/0092331 | A1* | 3/2022 | Stoppa ................. G06V 30/274 |

FOREIGN PATENT DOCUMENTS

| CN | 106815843 A | 6/2017 |
| CN | 109165682 A | 1/2019 |
| CN | 111279389 A | 6/2020 |
| CN | 112509046 A | 3/2021 |
| WO | 2023/088176 A1 | 5/2023 |

OTHER PUBLICATIONS

Boyd et al., "Human-Aided Saliency Maps Improve Generalization of Deep Learning," University of Notre Dame, May 7, 2021, 12 pages.
Figueroa-Flores et al., "Hallucinating Saliency Maps for Fine-Grained Image Classification for Limited Data Domains," Feb. 3, 2021, 10 pages.
Shahab Uddin et al., "Saliencymix: A Saliency Guided Data Augmentation Strategy for Better Regularization," CLR, 2021, 12 pages.

(Continued)

*Primary Examiner* — Neil R McLean
(74) *Attorney, Agent, or Firm* — Yee & Associates, P.C.

(57) ABSTRACT

A computer implemented method trains an image recognition model. A set of processor units creates a saliency map of an original image. The set of processor units superimposes the saliency map on the original image to form an augmented image, wherein the augmented image is used to train the image recognition model.

20 Claims, 9 Drawing Sheets

(56) References Cited

OTHER PUBLICATIONS

Wang et al., "How Could Saliency Map Help to Improve Model Performance," Institute for Applied Computational Science, 2021, 17 pages.
PCT International Search Report and Written Opinion, dated Feb. 6, 2023, regarding Application No. PCT/CN2022/131340, 7 pages.
LeCun et al. "The MNIST Database of handwritten digits", retrieved from web https://web.archive.org/web/20211101080029/http://yann.lecun.com/exdb/mnist/, Nov. 1, 2021, 7 pages.

* cited by examiner

| | TEST DATA (1) | | TEST DATA (2) | |
|---|---|---|---|---|
| | ACCURACY RATE | IMPROVEMENT RATE | ACCURACY RATE | IMPROVEMENT RATE |
| LEARNING DATA (1) | 96% | - | 77% | - |
| LEARNING DATA (2) | 98% | 2% | 83% | 6% |

FIG. 14

DATA AUGMENTATION FOR MACHINE LEARNING

BACKGROUND

1. Field

The disclosure relates generally to an improved a computer system and more specifically to a method, apparatus, system, and computer program product for increased accuracy in training machine learning models to recognize images.

2. Description of the Related Art

Machine learning involves using machine learning algorithms to build machine learning models using sample data. The sample data is also referred to as training data sets. Machine learning models can be trained to make predictions or decisions. For example, machine learning models can be used in analyzing images.

For example, machine learning models can be trained to recognize objects in images. A neural network is an example of a machine learning model that can be trained to recognize the patterns in images to perform object recognition. This type of training can involve deep learning such that the neural network can locate, identify, or both locate and identify objects in images.

The training of machine learning models such as neural networks to recognize objects in images is performed using data sets. These data sets can comprise images that have been labeled for use performing machine learning such as deep learning used with neural networks. This type of deep learning can result in neural networks that have comparable or better performance than human experts with respect to recognizing objects images. The quality training increases as the number of images available for training the neural network increases.

SUMMARY

According to one illustrative embodiment, a computer implemented method trains an image recognition model. A set of processor units creates a saliency map of an original image. The set of processor units superimposes the saliency map on the original image to form an augmented image, wherein the augmented image is used to train the image recognition model. According to other illustrative embodiments, a computer system and a computer program product for training an image recognition model are provided.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account a number of different considerations. For example, the illustrative embodiments recognize and take into account that the accuracy rate of object recognition from images increases with the use of deep learning. The illustrative embodiments also recognize and take into account that as the metadata increases in a data set, the accuracy rate of object recognition improves. The illustrative embodiments recognize and take into account, however, it is often difficult to collect the desired amount of data for the training data sets.

The illustrative embodiments recognize and take into account that although the use of deep learning and training neural networks has improved the accuracy rate of object recognition and images, this improvement is not present for all types of images. For example, the illustrative embodiments recognize and take into account that the recognition rate is lower than desired for images containing noise such as printed or scanned images and for analog images. The illustrative embodiments recognize and take into account that even for these types of images, the accuracy rate of object recognition can improve if sufficient training data is present.

The illustrative embodiments recognize and take into account that it is often difficult to collect large amounts of training data. Thus, the illustrative embodiments provide a method, apparatus, system, and computer program product for training image recognition models through augmenting training data. For example, original images can be augmented using saliency maps to create additional training data.

Figure 1:
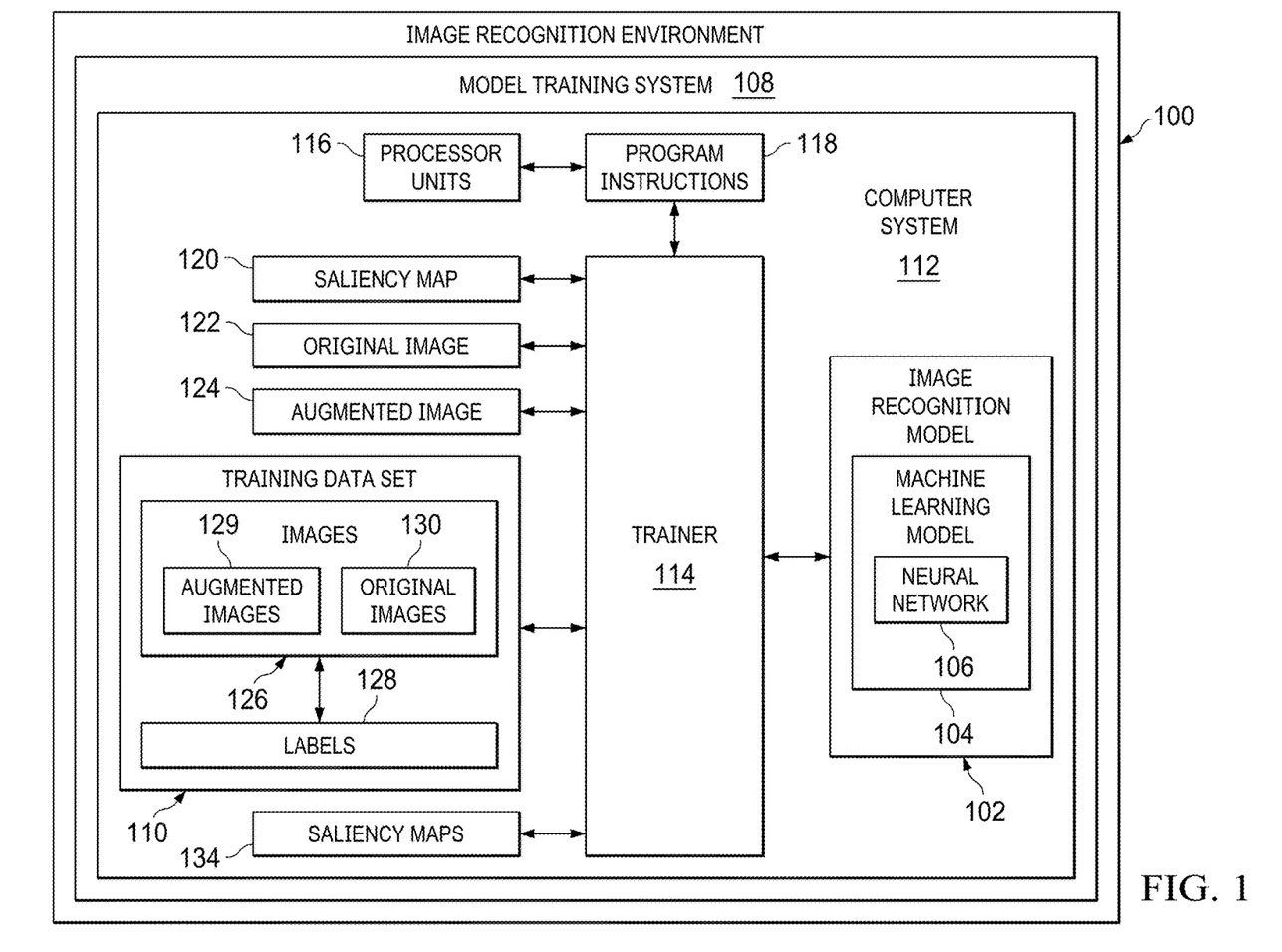
FIG. 1 is a block diagram of an image recognition model environment in accordance with an illustrative embodiment.

With reference now to FIG. 1, a block diagram of an image recognition model environment is depicted in accordance with an illustrative embodiment. In this illustrative example, image recognition environment 100 is an environment in which image recognition model 102 can be trained to perform image recognition. Image recognition model 102 can be machine learning model 104.

Machine learning model 104 is a type of artificial intelligence model that can learn without being explicitly programmed. A machine learning model can learn based on training data input into the machine learning model 104. Machine learning model 104 can learn using various types of machine learning algorithms. The machine learning algorithms include at least one of a supervised learning, unsupervised learning, deep learning, a feature learning, a sparse dictionary learning, an anomaly detection, association rules, or other types of learning algorithms. Examples of machine learning models include an artificial neural network, a decision tree, a support vector machine, a Bayesian network, a genetic algorithm, and other types of models. These machine learning models can be trained using data and process additional data to provide a desired output.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As depicted, machine learning model 104 can be neural network 106. Neural network 106 can be referred to as an artificial neural network. Neural network 106 comprises a collection of units or nodes also referred to as artificial neurons. Each connection between these nodes can transmit signals to other nodes. Neural network 106 take the form of a convolutional neural network in some illustrative examples.

In this illustrative example, neural network 106 can be trained to recognize the objects in images to perform object recognition. This type of training may involve deep learning such that the neural network can work various tasks with respect to analyzing images. For example, neural network 106 can perform at least one of identifying a class or a category in which an image belongs; recognizing a presence of several types of objects in an image; tagging objects in an image; identifying the location of objects in an image; or other suitable tasks with respect to performing object recognition.

Model training system 108 operates to train image recognition model 102 to perform object recognition using training data set 110. In this illustrative example, model training system 108 comprises computer system 112 and trainer 114. As depicted, trainer 114 is located in computer system 112. Trainer 114 can operate to create training data set 110 and use training data set 110 to train image recognition model 102.

Trainer 114 can be implemented in software, hardware, firmware or a combination thereof. When software is used, the operations performed by trainer 114 can be implemented in program instructions configured to run on hardware, such as a processor unit. When firmware is used, the operations performed by trainer 114 can be implemented in program instructions and data and stored in persistent memory to run on a processor unit. When hardware is employed, the hardware can include circuits that operate to perform the operations in trainer 114.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 112 is a physical hardware system and includes one or more data processing systems. When more than one data processing system is present in computer system 112, those data processing systems are in communication with each other using a communications medium. The communications medium can be a network. The data processing systems can be selected from at least one of a computer, a server computer, a tablet computer, or some other suitable data processing system.

As depicted, computer system 112 includes a number of processor units 116 that are capable of executing program instructions 118 implementing processes in the illustrative examples. As used herein a processor unit in the number of processor units 116 is a hardware device and is comprised of hardware circuits such as those on an integrated circuit that respond and process instructions and program code that operate a computer. When a number of processor units 116 execute program instructions 118 for a process, the number of processor units 116 is one or more processor units that can be on the same computer or on different computers. In other words, the process can be distributed between processor units on the same or different computers in a computer system. Further, the number of processor units 116 can be of the same type or different type of processor units. For example, the number of processor units 116 can be selected from at least one of a single core processor, a dual-core processor, a multi-processor core, a general-purpose central processing unit (CPU), a graphics processing un it (GPU), a digital signal processor (DSP), or some other type of processor unit.

As used herein, "a number of" when used with reference to items, means one or more items. For example, "a number of processor units 116" is one or more processor units.

In this illustrative example, trainer 114 in computer system 112 can operate to create saliency map 120 of original image 122. Original image 122 is an example of an image in training data set 110. Original image 122 is an image that has not been modified, augmented, or otherwise changed using saliency map 120.

Trainer 114 can superimpose saliency map 120 on original image 122 to form augmented image 124 that can be used to train image recognition model 102. As depicted, trainer 114 can train image recognition model 102 using augmented image 124. For example, in training image recognition model 102 using augmented image 124, trainer 114 can add augmented image 124 to training data set 110.

In the illustrative example, training data set 110 comprises images 126 and labels 128 for images 126. Images 126 comprises original images 130 and augmented images 129 created from superimposing saliency maps 134 on original images 130.

Trainer 114 then trains image recognition model 102 using training data set 110. As a result, increased accuracy formants can be obtained in training image recognition model 102 using training data set 110. With the use of augmented images 129 in addition to original images 130 the increased number of images 126 can provide a more robust training data set 110 for training image recognition model 102.

In one illustrative example, one or more features are present that overcome a problem with generating sufficient amounts of training data for training image recognition models to recognize objects in images. One or more features in the illustrative examples can enable generating desired amount of training data. In one illustrative example, a saliency map generated for an image can be superimposed on the image to generate and augmented image.

As a result, as the amounts of images available as training data is increased, the training data set is increased. The illustrative example can be useful in situations where collecting sufficient amounts of learning data such as printed images and analog images may be more difficult than desired. In another illustrative example, augmented images can be useful to increase accuracy of existing image recognition models, such as neural networks. Augmented images are created by superimposing a saliency map on the original image in which the saliency map estimates the degree of impact on the estimated score of the label.

Computer system 112 can be configured to perform at least one of the steps, operations, or actions described in the different illustrative examples using software, hardware, firmware or a combination thereof. As a result, computer system 112 operates as a special purpose computer system in which trainer 114 in computer system 112 enables generating additional amounts of training data and to increase accuracy through the use of saliency maps that estimate the degree of impact on the estimated score of the label. In particular, trainer 114 transforms computer system 112 into a special purpose computer system as compared to currently available general computer systems that do not have trainer 114.

In the illustrative example, the use of trainer 114 in computer system 112 integrates processes into a practical application for training image recognition models that increases the performance of computer system 112. In other words, trainer 114 in computer system 112 is directed to a practical application of processes integrated into trainer 114 in computer system 112 that increases the amount of training data available resulting in more accurate image recognition models. Further, trainer 114 in computer system 112 can reduce the time needed to obtain a desired amount of training data. Consequently, the functioning of computer system 112 is increased.

The illustration of image recognition environment 100 in FIG. 1 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

In the illustrative example, trainer 114 can augment multiple original images using multiple saliency maps to form augmented images for training data set 110. In another illustrative example, other images in addition to original images 130 can be present in images 126. In other words, although images 126 are shown in this example as containing original images 130 and augmented images 129, images 126 is not limited to only those types of images. Other images for which augmentation is not performed using saliency maps 134 can also be included in images 126 as part of training data set 110.

In yet another illustrative example, one or more image recognition models can be present in addition to or in place of image recognition model 102 that are trained in trainer 114. These image recognition models can be of the same or different types. For example, one image recognition model can be a neural network, while another image recognition model can be a regression-based machine learning model.

Figure 2:
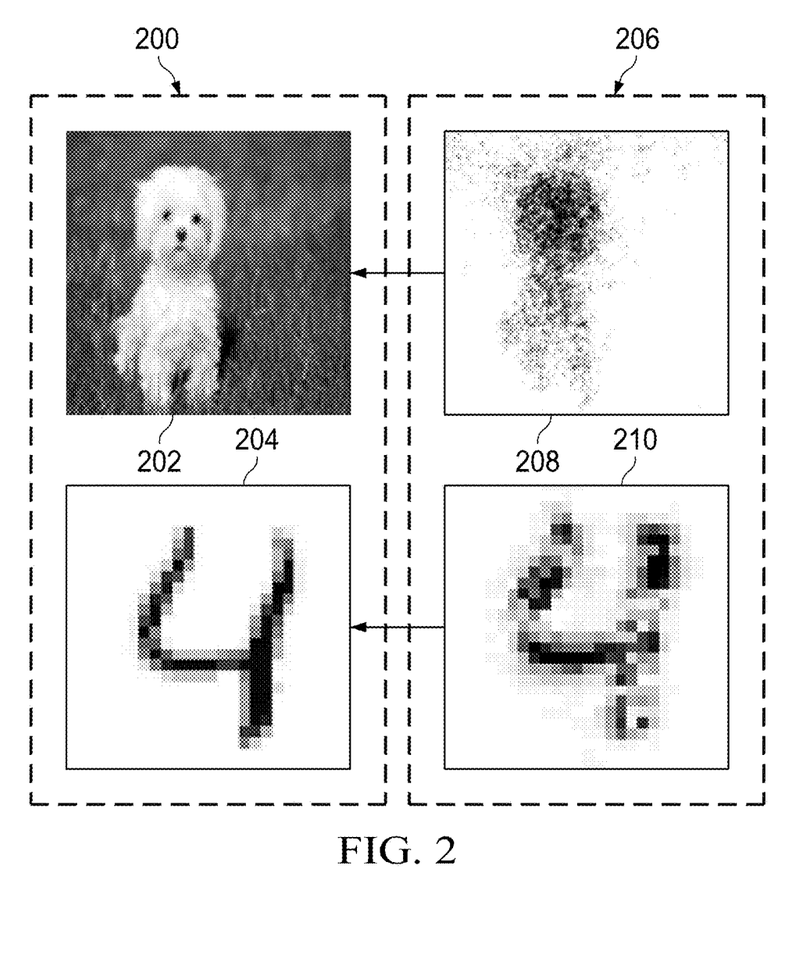
FIG. 2 is an illustration of original images and saliency maps in accordance with an illustrative embodiment.

Turning next to FIG. 2, an illustration of original images and saliency maps is depicted in accordance with an illustrative embodiment. As depicted, original images 200 comprise original image 202 and original image 204. Saliency maps 206 comprise saliency map 208 and saliency map 210. In the illustrative example, saliency map 208 is a saliency map for original image 202, and saliency map 210 is a saliency map for original image 204.

The saliency map is a map that estimates spots or areas that a person can easily notice when looking at an image. With respect to image recognition performed by image recognition model such as a neural network, a saliency map is a map that provides an estimate as to how much a change in a pixel value affects the estimated score of a label for in image corresponding to the saliency map. As depicted, as intensity for pixels in saliency maps 206 increase, increased impacts on the scores for labels assigned to original images 200 occur. For example, the intensities of pixels in saliency maps 206 can indicate which portions of those saliency maps have a greater influence on the score generated for a label. Thus, each pixel in the saliency map can have an influence on the score generated for label for the image for which the saliency map is generated. Thus, as the value or intensity of the pixel increases, that pixel has an increasing influence on the score. As the value or intensity of the pixel decreases, that pixel has a decreasing influence on the score. The impact of pixels can be on a per channel basis such as red, green, and blue.

As a result, the value of a given pixel in a channel indicates the influence of that pixel in that channel on the score that indicated the certainty of a label assigned to the image by an image recognition model. Therefore, superimposing the saliency map on the original image can have a significant impact on the score generated by the image recognition model. However, if the image recognition model is trained with the augmented images from superimposing of the saliency map on the original images, a label with the correct identification of an image can be obtained even if noise is present in the image.

Further, the values in the saliency map can be multiplied by a constant. This modified saliency map can be superimposed on the corresponding original image to create additional training data in addition to using the unmodified saliency map.

Figure 3:
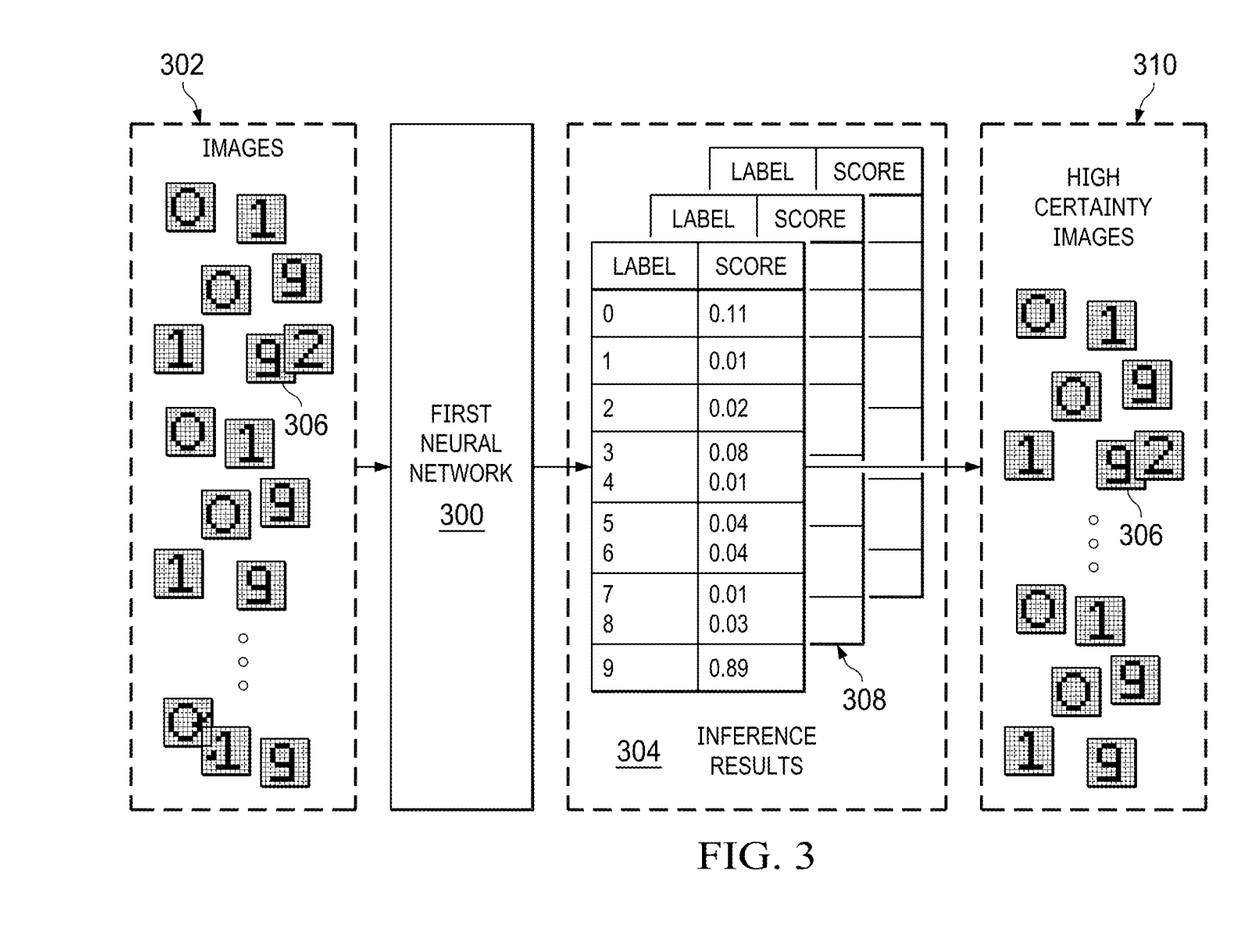
FIG. 3 is a process for identifying high certainty images used to generate a saliency map in accordance with an illustrative embodiment.
Figure 4:
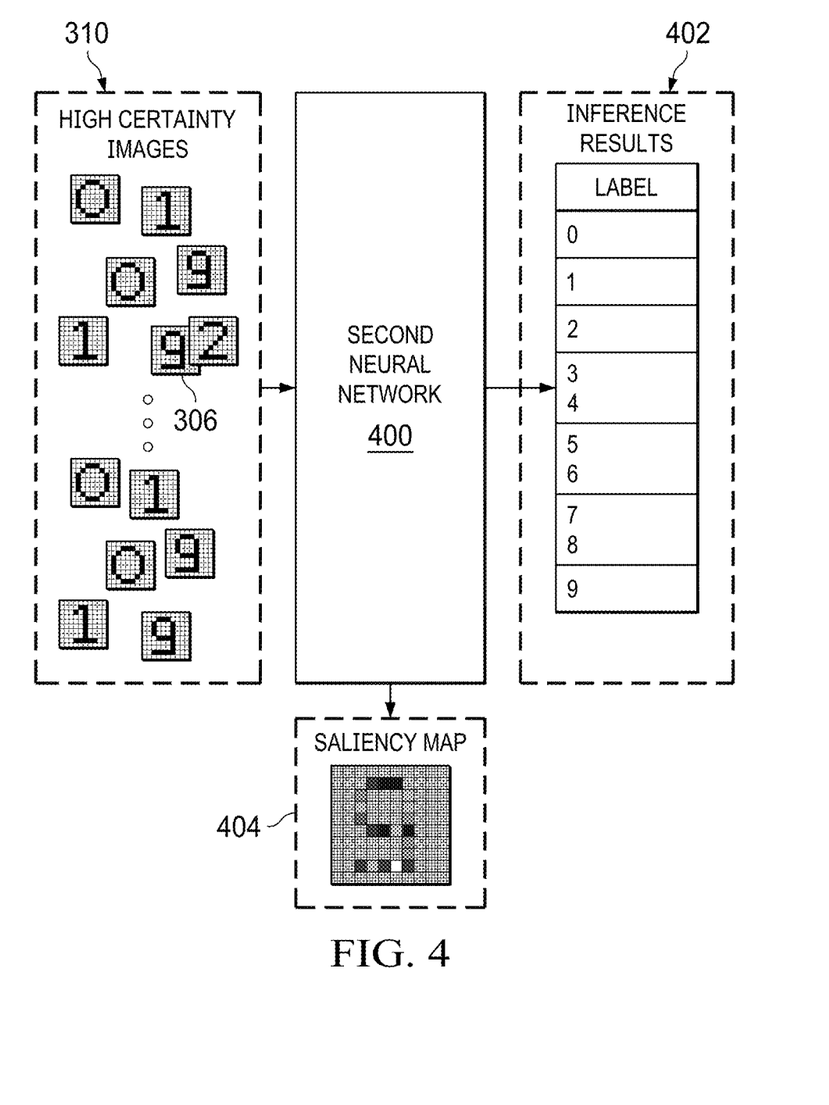
FIG. 4 is a process for generating using high certainty images in accordance with an illustrative embodiment.

FIGS. 3-4 illustrate a process for creating a saliency map. With reference first to FIG. 3, a process for identifying high certainty images used to generate a saliency map is depicted in accordance with an illustrative embodiment.

As depicted, first neural network 300 is a type of machine learning model that is trained using images as learning data for a training data set. After training, images 302 can be input into first neural network 300. First neural network 300 generates output in the form of inference results 304 in response to receiving images 302 as an input.

In this illustrative example, output in the form of inference results 304 comprises labels and scores for images 302. Each image can have inference result that provides scores as to the certainty for each possible label. For example, for image 306, first neural network 300 generates inference result 308 in inference results 304. As depicted, inference result 308 includes labels 0 through 9 with the corresponding scores for each label.

High certainty images 310 are images in which a score as to certainty of the label is above a selected threshold. The threshold can be selected on various factors including desired level of accuracy or inclusion. For example, the threshold level can be 0.8. As a result, inference result 308 for image 306 results in image 306 being identified as a high certainty image in high certainty images 310.

Turning to FIG. 4, a process for generating using high certainty images is depicted in accordance with an illustrative embodiment. As depicted, second neural network 400 is trained using high certainty images 310 is identified in FIG. 3. In the illustrative examples, the same reference numeral may be used in more than one figure. This reuse of a reference numeral in different figures represents the same element in the different figures.

As depicted, second neural network 400 can output inference results 402. In this illustrative example, saliency map 404 can be generated using inference results 402. As depicted, saliency map 404 can estimate the degree of impact on the estimated score for label. The degree of impact can be identified for particular pixels in saliency map 404 corresponding to an original image for which saliency map 404 is generated. For example, the degree of impact on the score can be reflected in the values for pixels in the saliency map 404 where some pixels have a higher level of impact than other pixels. Pixels with a higher level of impact can be indicated by the higher intensity of the pixels. In other illustrative examples, the impact of pixels on the score can be reflected using color instead of or in addition to using intensity.

Figure 5:
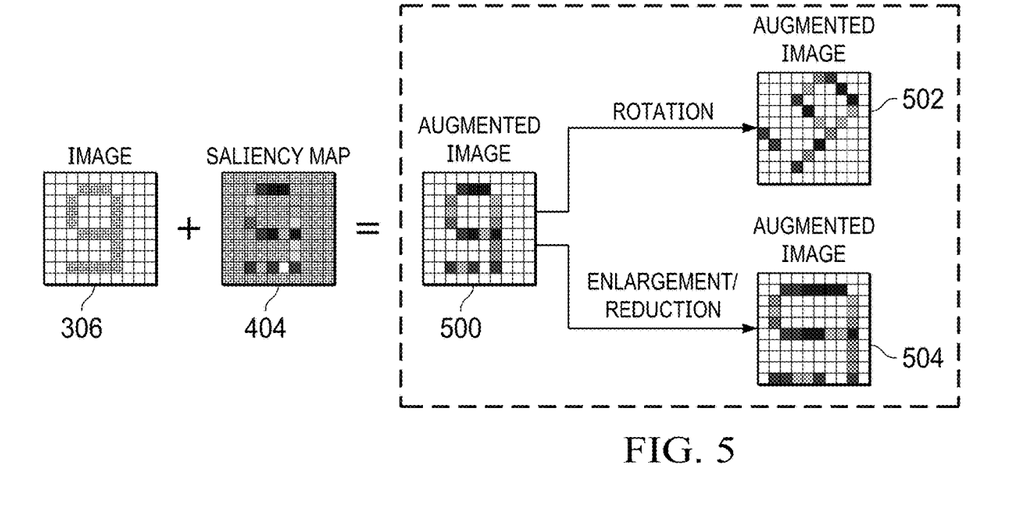
FIG. 5 is a process for generating augmented images using a saliency map in accordance with an illustrative embodiment.

With reference to FIG. 5, process for generating augmented images using a saliency map is depicted in accordance with an illustrative embodiment. In this illustrative example, image 306 is a high certainty image and saliency map 404 is the saliency map generated for image 306.

In this illustrative example, saliency map 404 can be superimposed on image 306 to form augmented image 500. Augmented image 500 can be rotated to form augmented image 502. As another example, augmented image 500 can also be enlarged or reduced to form augmented image 504. In this illustrative example, augmented image 500, augmented image 502, and augmented image 504 are images that can be used as training data in a training data set.

The illustration of the process for generating augmented images in FIGS. 3-5 is presented for purposes of illustrating one illustrative example. This illustration is not meant to limit the manner in which other illustrative examples can be implemented. For example, images containing objects in the form of numbers in this example.

Figure 6:
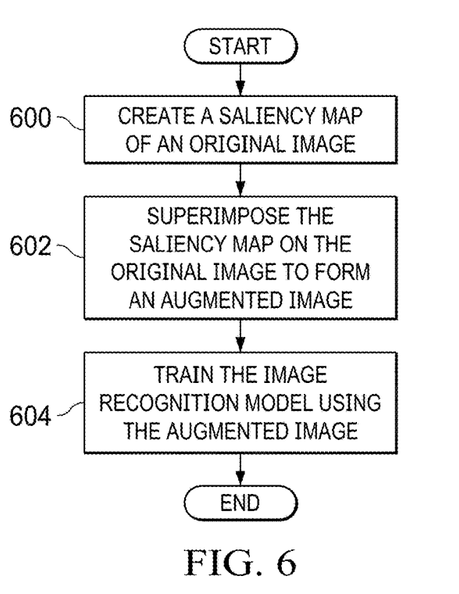
FIG. 6 is a flowchart of a process for training image recognition model in accordance with an illustrative embodiment.

Turning next to FIG. 6, a flowchart of a process for training image recognition model is depicted in accordance with an illustrative embodiment. The process in FIG. 6 can be implemented in hardware, software, or both. When implemented in software, the process can take the form of program instructions that is run by one or more processor units located in one or more hardware devices in one or more computer systems. For example, the process can be implemented in trainer 114 in computer system 112 in FIG. 1.

The process begins by creating a saliency map of an original image (step 600). The process superimposes the saliency map on the original image to form an augmented image (step 602).

The process trains the image recognition model using the augmented image (step 604). The process terminates thereafter.

Figure 7:
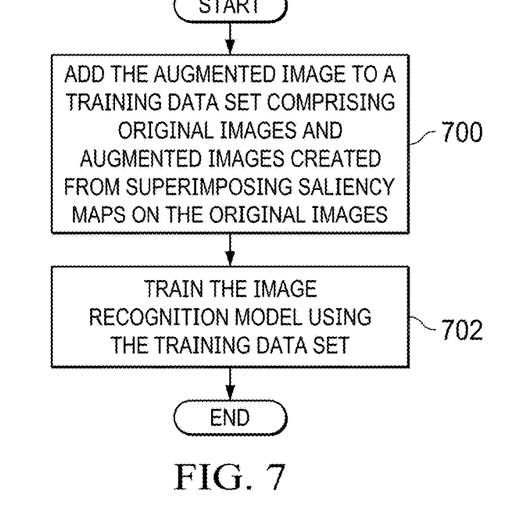
FIG. 7 is a flowchart of a process for training image recognition model in accordance with an illustrative embodiment.

With reference to FIG. 7, a flowchart of a process for training image recognition model is depicted in accordance with an illustrative embodiment. The steps illustrated in this flowchart is an example of an implementation for step 604 in FIG. 6.

The process begins by adding the augmented image to a training data set comprising original images and augmented images created from superimposing saliency maps on the original images (step 700). The process trains the image recognition model using the training data set (step 702). The process terminates thereafter.

The training in step 702 can be a performed on an image recognition model such as a machine learning model, a neural network, a combination of networks, or some other system that can be trained to recognize objects in an image using training data set. For example, step 702 can be performed to train a neural network using a supervised learning algorithm such as deep learning.

Figure 8:
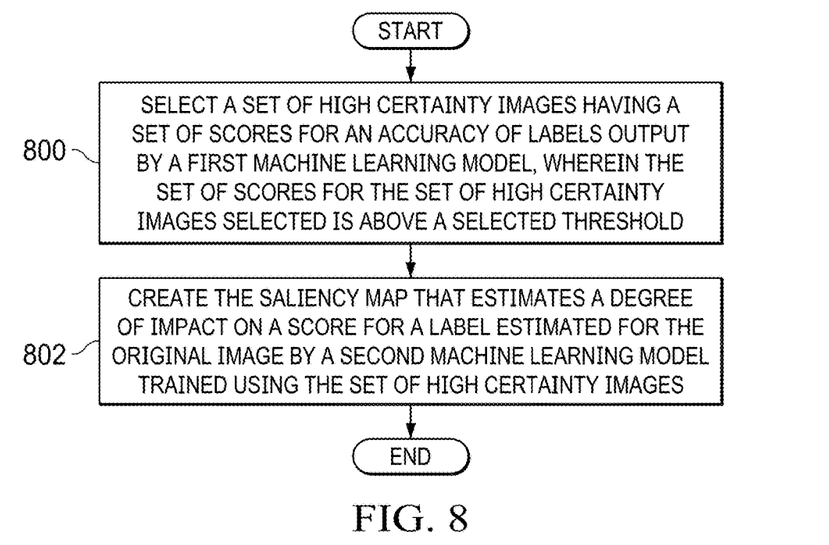
FIG. 8 is a flowchart of a process for creating a saliency map in accordance with an illustrative embodiment.

Turning next to FIG. 8, a flowchart of a process for creating a saliency map is depicted in accordance with an illustrative embodiment. The illustration of the steps in this flowchart is an example of an implementation for step 600 in FIG. 6.

The process begins by selecting a set of high certainty images having a set of scores for an accuracy of labels output by a first machine learning model, wherein the set of scores for the set of high certainty images selected is above a selected threshold (step 800). The process creates the saliency map that estimates a degree of impact on a score for a label estimated for the original image by a second machine learning model trained using the set of high certainty images (step 802). The process terminates thereafter.

Figure 9:
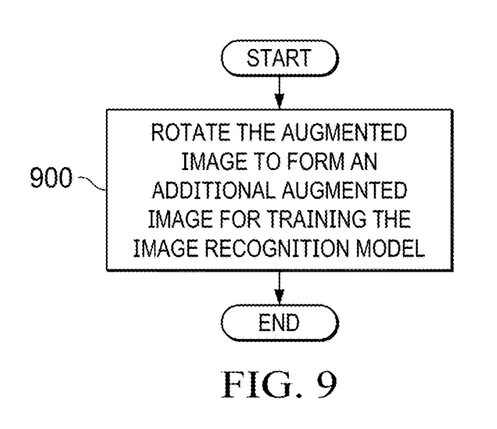
FIG. 9 is a flowchart of a process for creating a saliency map in accordance with an illustrative embodiment.

In FIG. 9, a flowchart of a process for creating a saliency map is depicted in accordance with an illustrative embodiment. The flowchart is an example of an implementation for step 602 in FIG. 6.

The process rotates the augmented image to form an additional augmented image for training the image recognition model (step 900). The process terminates thereafter.

Figure 10:
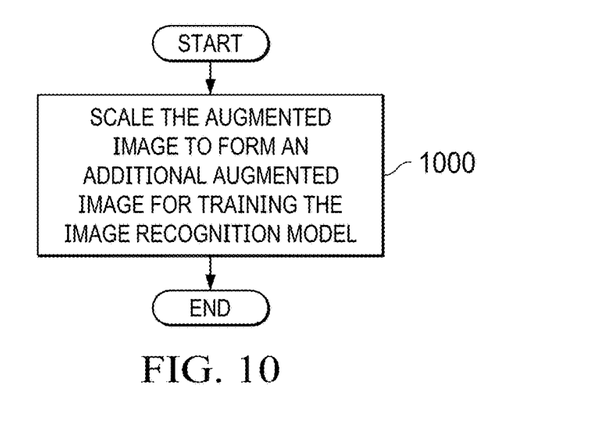
FIG. 10 is a flowchart of a process for creating a saliency map in accordance with an illustrative embodiment.

With reference now to FIG. 10, a flowchart of a process for creating a saliency map is depicted in accordance with an illustrative embodiment. This flowchart is an example of an implementation for step 602 in FIG. 6.

The process scales the augmented image to form an additional augmented image for training the image recognition model (step 1000). The process terminates thereafter. In this illustrative example, the scaling can take a number of different forms. For example, scaling can be to enlarge the object in the augmented image. As another example, the scaling can be to reduce the size of the object in the augmented image.

Figure 11:
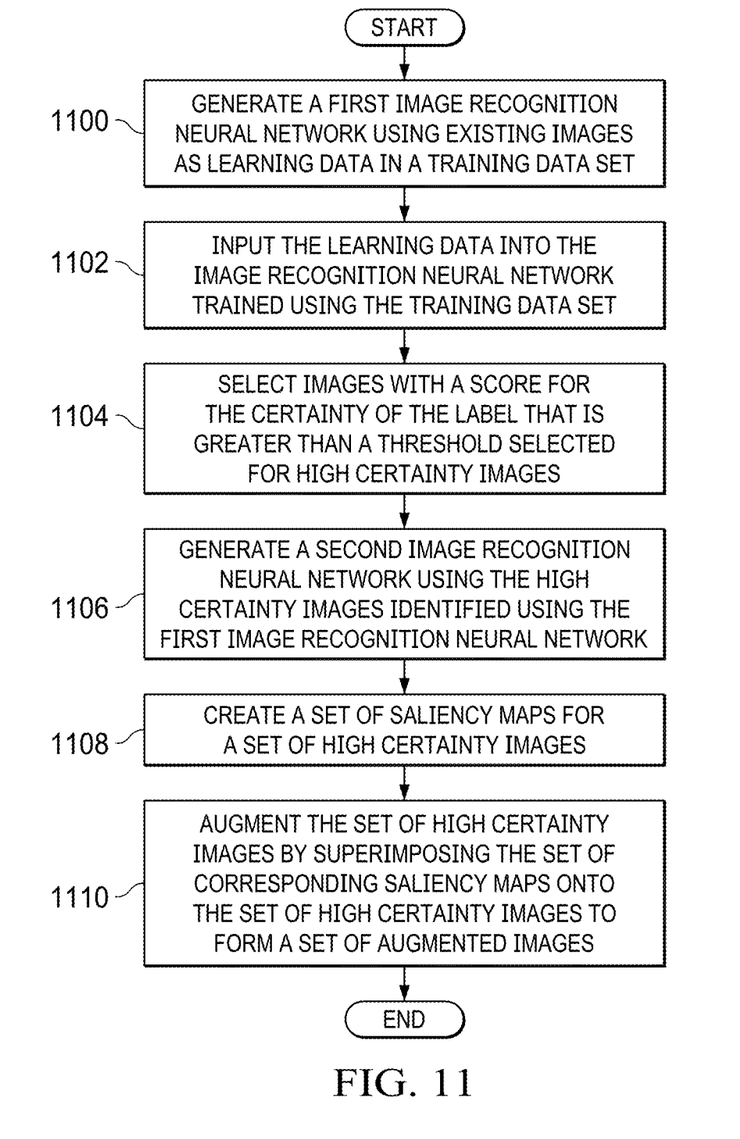
FIG. 11 is a flowchart of a process for training image recognition model is depicted in accordance with an illustrative embodiment.

Turning to FIG. 11, a flowchart of a process for training image recognition model is depicted in accordance with an illustrative embodiment. The process in FIG. 11 can be implemented in hardware, software, or both. When implemented in software, the process can take the form of program instructions that is run by one or more processor units located in one or more hardware devices in one or more computer systems. For example, the process can be implemented in trainer 114 in computer system 112 in FIG. 1.

The process begins by generating a first image recognition neural network using existing images as learning data in a training data set (step 1100). The process inputs the learning data into the image recognition neural network trained using the training data set (step 1102). The process selects images with a score for the certainty of the label that is greater than a threshold selected for high certainty images (step 1104).

The process generates a second image recognition neural network using the high certainty images identified using the first image recognition neural network (step 1106). The process creates a set of saliency maps for a set of high certainty images (step 1108).

The process augments the set of high certainty images by superimposing the set of corresponding saliency maps onto the set of high certainty images to form a set of augmented images (step 1110). The process terminates thereafter. The set of augmented images can be added to the training data set along with the originating images used to create the augmented images using the saliency maps. As a result, the amount of training data can be increased through this augmentation process.

In step 1110, the augmentation can include augmenting the original image with the saliency map to form the augmented image. In another illustrative example, additional augmented images can be created in addition to or in place of the augmented image by at least one of rotating the augmented image, enlarging the augmented image, or reducing the augmented image. As a result, multiple augmented images can be created for each original image.

Figure 12:
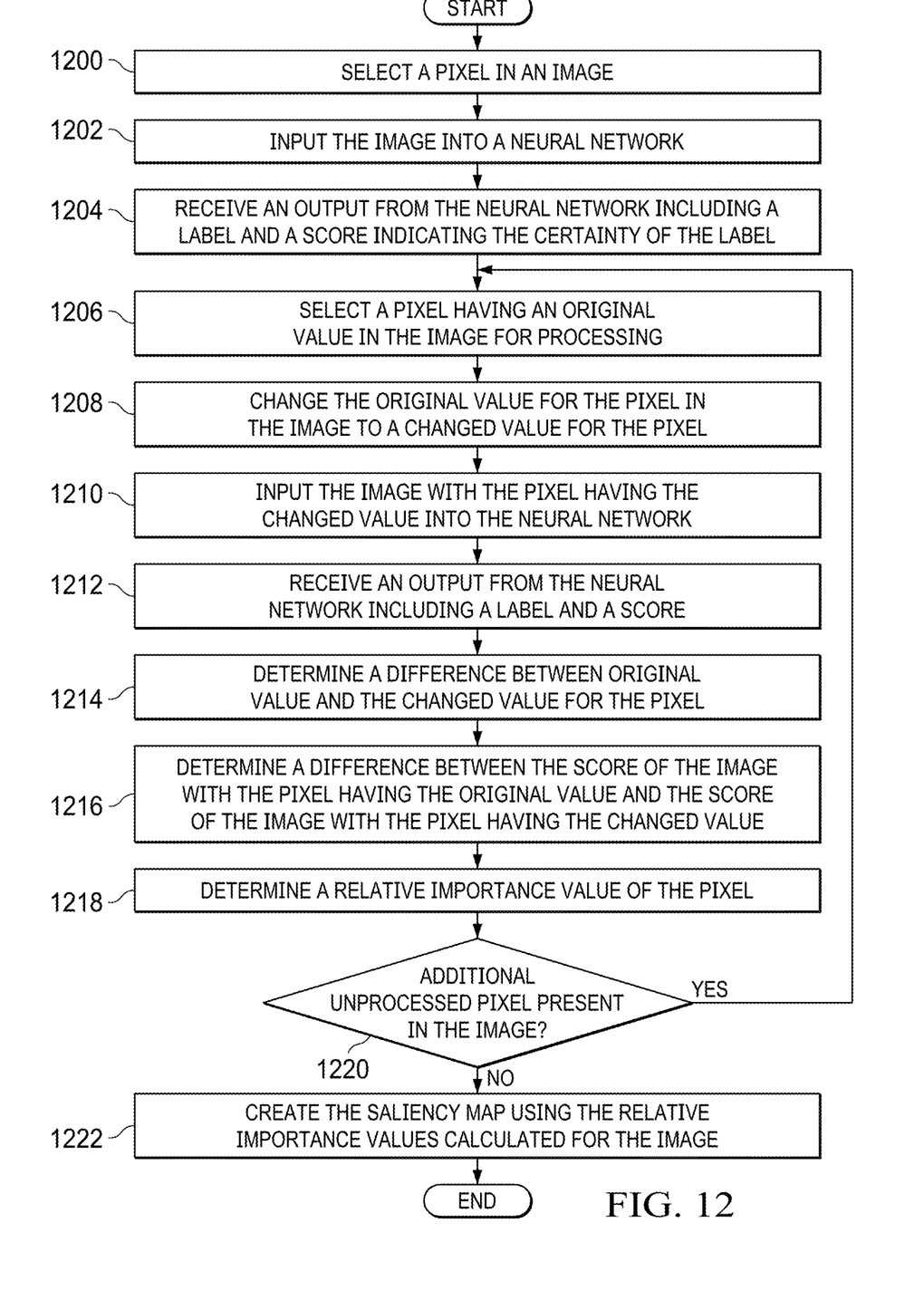
FIG. 12 is a flowchart of a process for creating a saliency map for an image in accordance with an illustrative embodiment.

With reference next to FIG. 12, a flowchart of a process for creating a saliency map for an image is depicted in accordance with an illustrative embodiment. The process in FIG. 12 can be used in step 802 in FIG. 8 to determine pixel values for a saliency map for an image in which the values indicate how much each pixel will affect the score for the certainty of a label output by a neural network in response to inputting the image into the neural network.

The process selects a pixel in an image (step 1200). The process inputs the image into a neural network (step 1202). The process receives an output from the neural network including a label and a score indicating the certainty of the label (step 1204).

The process selects a pixel having an original value in the image for processing (step 1206). The process changes the original value for the pixel in the image to a changed value for the pixel (step 1208). The process inputs the image with the pixel having the changed value into the neural network (step 1210). The process receives an output from the neural network including a label and a score (step 1212).

The process determines a difference between the original value and the changed value for the pixel (step 1214). The process determines a difference between the score of the image with the pixel having the original value and the score of the image with the pixel having the changed value (step 1216). The process determines a relative importance value of the pixel (step 1218). In step 1218, the relative importance value is determined as follows:

$$\text{Saliency map}(i, j, c) = \frac{\partial \text{confidence\_value}}{\partial \text{pixel value}(i, j, c)}$$

wherein ∂confidence_value is the difference in the scores for the confidence for a label and ∂pixel value (i, j, c) is the difference in the pixel value, i,j is the pixel location, and c is the channel. In this depicted example, c can be one of red, green, or blue. The influence can be determined on a per channel basis for color channels red, green, blue (RGB).

A determination is made as to whether an additional unprocessed pixel is present in the image (step 1220). If an additional unprocessed pixel is present, the process returns to step 1206. Otherwise, the process creates the saliency map using the relative importance values calculated for the image (step 1222). The process terminated thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 13:
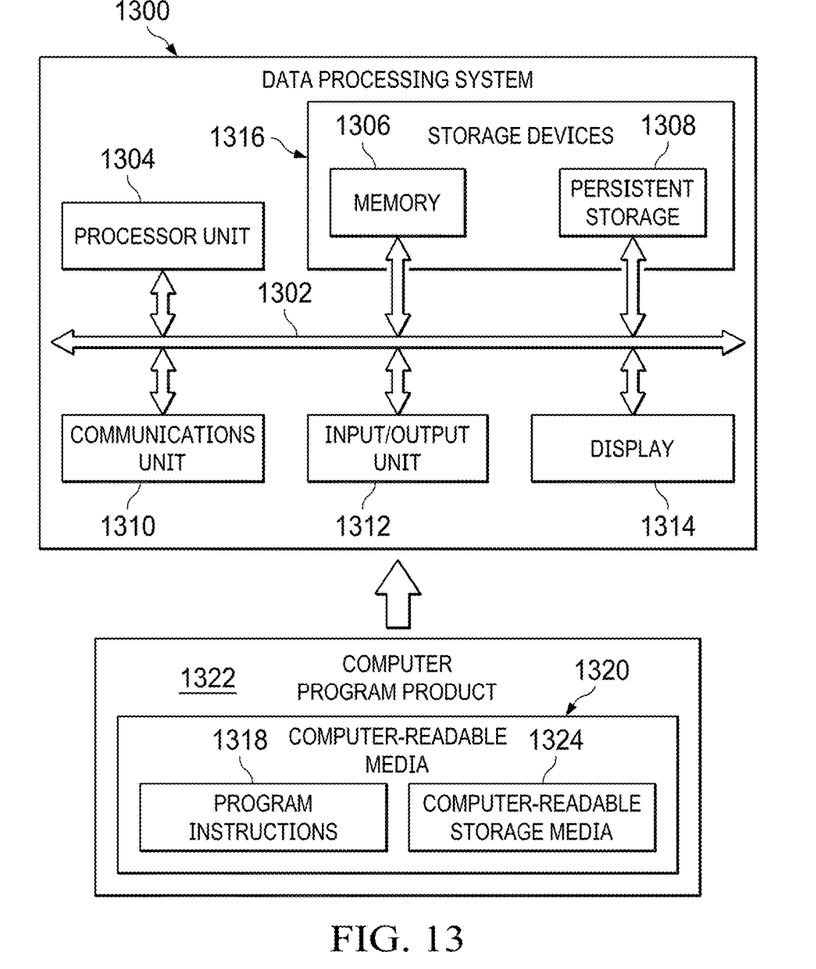
FIG. 13 is a block diagram of a data processing system in accordance with an illustrative embodiment.

Turning now to FIG. 13, a block diagram of a data processing system is depicted in accordance with an illustrative embodiment. Data processing system 1300 can be used to implement computer system 112 in FIG. 1. In this illustrative example, data processing system 1300 includes communications framework 1302, which provides communications between processor unit 1304, memory 1306, persistent storage 1308, communications unit 1310, input/output (I/O) unit 1312, and display 1314. In this example, communications framework 1302 takes the form of a bus system.

Processor unit 1304 serves to execute instructions for software that can be loaded into memory 1306. Processor unit 1304 includes one or more processors. For example, processor unit 1304 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1304 can may be implemented using one or more heterogeneous processor systems in which a main processor is present with secondary processors on a single chip. As another illustrative example, processor unit 1304 can be a symmetric multi-processor system containing multiple processors of the same type on a single chip.

Memory 1306 and persistent storage 1308 are examples of storage devices 1316. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1316 may also be referred to as computer-readable storage devices in these illustrative examples. Memory 1306, in these examples, can be, for example, a random-access memory or any other suitable volatile or non-volatile storage device. Persistent storage 1308 may take various forms, depending on the particular implementation.

For example, persistent storage 1308 may contain one or more components or devices. For example, persistent storage 1308 can be a hard drive, a solid-state drive (SSD), a flash memory, a rewritable optical disk, a rewritable magnetic tape, or some combination of the above. The media used by persistent storage 1308 also can be removable. For example, a removable hard drive can be used for persistent storage 1308.

Communications unit 1310, in these illustrative examples, provides for communications with other data processing systems or devices. In these illustrative examples, communications unit 1310 is a network interface card.

Input/output unit 1312 allows for input and output of data with other devices that can be connected to data processing system 1300. For example, input/output unit 1312 may provide a connection for user input through at least one of a keyboard, a mouse, or some other suitable input device. Further, input/output unit 1312 may send output to a printer. Display 1314 provides a mechanism to display information to a user.

Instructions for at least one of the operating system, applications, or programs can be located in storage devices 1316, which are in communication with processor unit 1304 through communications framework 1302. The processes of the different embodiments can be performed by processor unit 1304 using computer-implemented instructions, which may be located in a memory, such as memory 1306.

These instructions are referred to as program instructions, computer usable program instructions, or computer-readable program instructions that can be read and executed by a processor in processor unit 1304. The program instructions in the different embodiments can be embodied on different physical or computer-readable storage media, such as memory 1306 or persistent storage 1308.

Program instructions 1318 is located in a functional form on computer-readable media 1320 that is selectively removable and can be loaded onto or transferred to data processing system 1300 for execution by processor unit 1304. Program instructions 1318 and computer-readable media 1320 form computer program product 1322 in these illustrative examples. In the illustrative example, computer-readable media 1320 is computer-readable storage media 1324.

Computer-readable storage media 1324 is a physical or tangible storage device used to store program instructions 1318 rather than a medium that propagates or transmits program instructions 1318. Computer readable storage media 1324, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1318 can be transferred to data processing system 1300 using a computer-readable signal media. The computer-readable signal media are signals and can be, for example, a propagated data signal containing program instructions 1318. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1320" can be singular or plural. For example, program instructions 1318 can be located in computer-readable media 1320 in the form of a single storage device or system. In another example, program instructions 1318 can be located in computer-readable media 1320 that is distributed in multiple data processing systems. In other words, some instructions in program instructions 1318 can be located in one data processing system while other instructions in program instructions 1318 can be located in one data processing system. For example, a portion of program instructions 1318 can be located in computer-readable media 1320 in a server computer while another portion of program instructions 1318 can be located in computer-readable media 1320 located in a set of client computers.

The different components illustrated for data processing system 1300 are not meant to provide architectural limitations to the manner in which different embodiments can be implemented. In some illustrative examples, one or more of the components may be incorporated in or otherwise form a portion of, another component. For example, memory 1306, or portions thereof, may be incorporated in processor unit 1304 in some illustrative examples. The different illustrative embodiments can be implemented in a data processing system including components in addition to or in place of those illustrated for data processing system 1300. Other components shown in FIG. 13 can be varied from the illustrative examples shown. The different embodiments can be implemented using any hardware device or system capable of running program instructions 1318.

EXAMPLE

A verification experiment was carried out using Modified National Institute of Standards and Technology (MNIST) data set of handwritten numbers. In this dataset, 60,000 small square 28×28 pixel grayscale images of handwritten single digits between 0 and 9 are present. In this example, learning data (1) comprised 60,000 images, and learning data (2) comprised 60,000 images including 30,000 images of MNIST handwritten numbers and 30,000 augmented images using saliency maps.

In this example, the test data (1) comprised 10,000 images of Modified National Institute of Standards and Technology (MNIST) handwritten numbers, and test data (2) comprised 1000 images of MNIST handwritten numbers (100 images for each number). Test data (1) was inferred using an image recognition neural network created using learning data (1). According to the inference, images with low certainty were extracted for test data (1). These images are ones that are difficult to distinguish.

Figure 14:
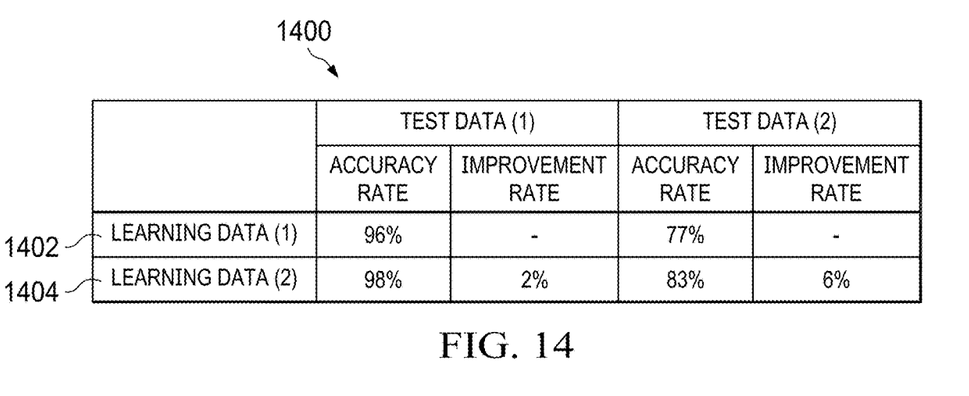
FIG. 14 is a table of results from neural network trained using learning data with images and learning data including augmented images in accordance with an illustrative embodiment.

Turning to FIG. 14, an illustration of a table of results from neural network trained using learning data with images and learning data including augmented images is depicted in accordance with an illustrative embodiment. In this illustrative example, table 1400 shows the results of image recognition using test data on two neural networks. Row 1402 shows results for a neural network trained using learning data (1) and row 1404 shows results for neural network trained using learning data (2).

As can be seen from the results in table 1400, the accuracy rate in recognizing objects and images is greater using the neural network trained using original images and augmented images in learning data (2). Further, the results also showed that the improvement rate is significant especially for images that are difficult to distinguish.

Thus, illustrative embodiments of the present invention provide a computer implemented method, computer system, and computer program product for training an image recognition model. A computer implemented method trains an image recognition model. A set of processor units creates a saliency map of an original image. The set of processor units superimposes the saliency map on the original image to form an augmented image, wherein the augmented image is used to train the image recognition model.

The set of processor units can train image recognition model using the augmented image. For example, the augmented image can be added to a training data set that contains original images and augmented images created from superimposing silencing maps on the original images. This training data set can be used to train the image recognition model, which can be, for example, a machine learning model, a neural network, a convolutional neural network, or some other suitable type of model that can be trained to recognize objects in images.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for training an image recognition model, the computer implemented method comprising:
   creating, by a set of processor units, a saliency map of an original image; and
   superimposing, by the set of processor units, the saliency map on the original image to form an augmented image, wherein the augmented image is used to train the image recognition model.

2. The computer implemented method of claim 1 further comprising:
   training, by the set of processor units, the image recognition model using the augmented image formed by superimposing the saliency map on the original image, wherein the saliency map is a map that provides an estimate as to how much a change in a pixel value affects an estimated score of a label for the original image corresponding to the saliency map.

3. The computer implemented method of claim 2, wherein training, by the set of processor units, the image recognition model using the augmented image comprises:
   adding, by the set of processor units, the augmented image to a training data set comprising original images and augmented images created from superimposing saliency maps on the original images; and
   training, by the set of processor units, the image recognition model using the training data set.

4. The computer implemented method of claim 1, wherein creating, by the set of processor units, the saliency map of the original image comprises:
   selecting, by the set of processor units, a set of high certainty images having a set of scores for an accuracy of labels output by a first machine learning model, wherein the set of scores for the set of high certainty images selected is above a selected threshold; and
   creating, by the set of processor units, the saliency map that estimates a degree of impact on a score for a label estimated for the original image by a second machine learning model trained using the set of high certainty images.

5. The computer implemented method of claim 1 further comprising:
   rotating, by the set of processor units, the augmented image formed by superimposing the saliency map on the original image to form an additional augmented image for training the image recognition model; and
   training, by the set of processor units, the image recognition model using the additional augmented image.

6. The computer implemented method of claim 1 further comprising:
   scaling, by the set of processor units, the augmented image formed by superimposing the saliency map on the original image to form an additional augmented image for training the image recognition model, wherein scaling the augmented image comprises at least one of enlarging an object in the augmented image and reducing a size of the object in the augmented image; and
   training, by the set of processor units, the image recognition model using the additional augmented image.

7. The computer implemented method of claim 1, wherein the image recognition model is selected from a group comprising a machine learning model, a neural network, a convolutional neural network.

8. A computer system comprising:
   a number of processor units, wherein the number of processor units executes program instructions to:
   create a saliency map of an original image; and
   superimpose the saliency map on the original image to form an augmented image, wherein the augmented image is used to train an image recognition model.

9. The computer system of claim 8, wherein the number of processor units executes program instructions to:
   train the image recognition model using the augmented image formed by superimposing the saliency map on the original image, wherein the saliency map is a map that provides an estimate as to how much a change in a pixel value affects an estimated score of a label for the original image corresponding to the saliency map.

10. The computer system of claim 9, wherein in training the image recognition model using the augmented image, the number of processor units executes program instructions to:

add the augmented image to a training data set comprising original images and augmented images created from superimposing saliency maps on the original images; and train the image recognition model using the training data set.

11. The computer system of claim 8, wherein in creating the saliency map of the original image, the number of processor units executes program instructions to:

select a set of high certainty images having a set of scores for an accuracy of labels output by a first machine learning model, wherein the set of scores for the set of high certainty images selected is above a selected threshold; and create the saliency map that estimates a degree of impact on a score for a label estimated for the original image by a second machine learning model trained using the set of high certainty images.

12. The computer system of claim 8, wherein the number of processor units executes program instructions to:

rotate the augmented image formed by superimposing the saliency map on the original image to form an additional augmented image for training the image recognition model; and training, by the set of processor units, the image recognition model using the additional augmented image.

13. The computer system of claim 8, wherein the number of processor units executes program instructions to:

scale the augmented image formed by superimposing the saliency map on the original image to form an additional augmented image for training the image recognition model, wherein scaling the augmented image comprises at least one of enlarging an object in the augmented image and reducing a size of the object in the augmented image; and train the image recognition model using the additional augmented image.

14. The computer system of claim 8, wherein the image recognition model is selected from a group comprising a machine learning model a neural network, and a convolutional neural network.

15. A computer program product for training an image recognition model, the computer program product comprising:

a non-transitory computer readable storage medium having program instructions embodied therewith, the program instructions executable by a computer system to cause the computer system to perform a method of:

creating, by a set of processor units, a saliency map of an original image; and superimposing, by the set of processor units, the saliency map on the original image to form an augmented image, wherein the augmented image is used to train the image recognition model.

16. The computer program product of claim 15 further comprising:

training, by the set of processor units, the image recognition model using the augmented image formed by superimposing the saliency map on the original image, wherein the saliency map is a map that provides an estimate as to how much a change in a pixel value affects an estimated score of a label for the original image corresponding to the saliency map.

17. The computer program product of claim 16, wherein training, by the set of processor units, the image recognition model using the augmented image comprises:

adding, by the set of processor units, the augmented image to a training data set comprising original images and augmented images created from superimposing saliency maps on the original images; and training, by the set of processor units, the image recognition model using the training data set.

18. The computer program product of claim 15, wherein creating, by the set of processor units, the saliency map of the original image comprises:

selecting, by the set of processor units, a set of high certainty images having a set of scores for an accuracy of labels output by a first machine learning model, wherein the set of scores for the set of high certainty images selected is above a selected threshold; and creating, by the set of processor units, the saliency map that estimates a degree of impact on a score for a label estimated for the original image by a second machine learning model trained using the set of high certainty images.

19. The computer program product of claim 15 further comprising:

scaling, by the set of processor units, the augmented image formed by superimposing the saliency map on the original image to form an additional augmented image for training the image recognition model, wherein scaling the augmented image comprises at least one of enlarging an object in the augmented image and reducing a size of the object in the augmented image; and training, by the set of processor units, the image recognition model using the additional augmented image.

20. The computer program product of claim 15 further comprising:

superimposing, by the set of processor units, the saliency map on the original image without modifications to form the augmented image.

* * * * *